US006827110B2

(12) United States Patent
Watkins

(10) Patent No.: US 6,827,110 B2
(45) Date of Patent: Dec. 7, 2004

(54) SUBSEA INSULATED PIPELINE WITH PRE-CURED SYNTACTIC ELEMENTS AND METHODS OF MANUFACTURE

(75) Inventor: Lou W. Watkins, Stoughton, MA (US)

(73) Assignee: Cuming Corporation, Avon, MA (US)

( * ) Notice: Subject to any disclaimer, the term of this patent is extended or adjusted under 35 U.S.C. 154(b) by 0 days.

(21) Appl. No.: 10/337,468

(22) Filed: Jan. 7, 2003

(65) Prior Publication Data

US 2003/0127148 A1 Jul. 10, 2003

Related U.S. Application Data

(60) Provisional application No. 60/346,686, filed on Jan. 7, 2002.

(51) Int. Cl.[7] .................................................. F16L 9/14
(52) U.S. Cl. ......................... 138/149; 138/148; 138/144; 138/112
(58) Field of Search ................................ 138/149, 114, 138/148, 113, 112, 144, 129; 428/36.5

(56) References Cited

U.S. PATENT DOCUMENTS

| | | | |
|---|---|---|---|
| 3,622,437 A | 11/1971 | Hobaica et al. ............ 428/34.5 |
| 3,729,756 A | 5/1973 | Cook et al. ................. 441/133 |
| 3,744,016 A | 7/1973 | Davis ......................... 307/154 |
| 3,900,543 A | 8/1975 | Davis ......................... 264/45.3 |
| 3,935,632 A | 2/1976 | Maxon ........................ 138/149 |
| 3,996,654 A | 12/1976 | Johnson ....................... 29/458 |
| 4,021,589 A | 5/1977 | Copley ......................... 428/68 |
| 4,040,165 A | 8/1977 | Miessler et al. .............. 29/458 |
| 4,065,150 A | 12/1977 | Van Auken ................. 280/610 |
| 4,194,536 A | 3/1980 | Stine et al. .................. 138/149 |
| 4,330,685 A | 5/1982 | Bleikamp, Jr. ............ 174/101.5 |
| 4,348,243 A | 9/1982 | Craubner ..................... 156/71 |
| 4,464,082 A | 8/1984 | Isaacs ......................... 405/157 |
| 4,474,129 A | 10/1984 | Watkins et al. .............. 114/243 |
| 4,477,207 A | 10/1984 | Johnson ....................... 405/195 |
| 4,482,590 A | 11/1984 | Bouley et al. ................. 428/35 |
| 4,522,578 A | 6/1985 | Martin, Jr. et al. .......... 425/110 |
| 4,568,603 A | 2/1986 | Oldham ....................... 428/195 |
| 4,590,971 A | 5/1986 | Webster et al. ............. 138/149 |
| 4,595,623 A | 6/1986 | Du Pont et al. ............. 428/195 |
| 4,657,050 A | 4/1987 | Patterson .................... 138/149 |
| 4,659,253 A | 4/1987 | Jacobson .................... 405/171 |
| 4,660,861 A | 4/1987 | Argy et al. .................. 138/149 |
| 4,676,695 A | 6/1987 | Duthweiler ................. 405/157 |
| 4,698,887 A | 10/1987 | Patell et al. .................. 29/157 |
| 4,744,842 A | 5/1988 | Webster et al. ............... 156/78 |
| 4,768,455 A | 9/1988 | Maxson et al. ............. 114/264 |
| 4,900,488 A | 2/1990 | Collins et al. ............. 264/45.7 |
| 4,963,420 A | 10/1990 | Jarrin et al. ................ 428/36.9 |

(List continued on next page.)

FOREIGN PATENT DOCUMENTS

| | | |
|---|---|---|
| DE | 32 16 463 | 3/1983 |
| EP | 0 380 163 | 1/1990 |
| JP | 1040 315 | 2/1989 |
| WO | WO 99/05447 | 2/1999 |
| WO | WO 99/57182 | 11/1999 |

Primary Examiner—Patrick Brinson
(74) Attorney, Agent, or Firm—Gauthier & Connors LLP

(57) ABSTRACT

An insulated pipeline comprises an inner pipe, and an outer poly sleeve co-axial with the inner pipe. The inner pipe and the outer poly sleeve are in spaced relationship to define an annulus. An insulating core within the annulus encases lengthwise the inner pipe, and comprises a plurality of pre-cured syntactic elements. A first binder fills interstices in the annulus. The pre-cured syntactic elements include microspheres and a second binder. Each of the pre-cured syntactic elements may also include macrospheres. The pre-cured syntactic elements preferably extruded and cylindrically shaped. In addition, in one embodiment, the second binder is preferably more rigid than the first binder.

14 Claims, 3 Drawing Sheets

U.S. PATENT DOCUMENTS

| | | |
|---|---|---|
| 5,094,111 A | 3/1992 | Collins et al. ................. 73/834 |
| 5,115,103 A | 5/1992 | Yamanishi et al. ........... 174/24 |
| 5,158,727 A | 10/1992 | Coleman-Kammula et al. .......................... 264/109 |
| 5,432,205 A | 7/1995 | Arnold, Jr. et al. ........... 521/54 |
| 5,476,343 A | 12/1995 | Summer ...................... 405/157 |
| 5,597,522 A | 1/1997 | Curzon et al. ......... 264/177.16 |
| 5,658,519 A | 8/1997 | March et al. ............... 264/2.77 |
| 6,227,250 B1 * | 5/2001 | Coutarel ..................... 138/149 |

* cited by examiner

US 6,827,110 B2

SUBSEA INSULATED PIPELINE WITH PRE-CURED SYNTACTIC ELEMENTS AND METHODS OF MANUFACTURE

CROSS REFERENCE TO RELATED APPLICATIONS

This application claims priority from the provisional application designated Ser. No. 60/346,686 filed Jan. 7, 2002 and entitled "Method of Making Syntactic Foam Insulation". This application is hereby incorporated by reference.

BACKGROUND OF THE INVENTION

The invention relates to the field of insulated pipelines, and in particular to the field of insulated subsea pipelines and subsea insulated pipelines manufactured with pre-cured syntactic elements.

The resistance to flow of liquid products such as oil increases as temperature decreases. This problem can be reduced by using thermally insulated pipelines. However, for offshore pipelines it has usually been more cost effective to reduce the need for insulation by injecting various chemicals into the product.

However, more and more oil and gas is being recovered in deeper, colder water, from subsea production systems where use of viscosity reducing chemicals requires a dedicated line to transport them to the wellhead. This of course is rather expensive.

These prior art insulators worked in the past because the operational depth of the pipeline was rather shallow. However, the oil industry has undergone a rapid movement into deeper water. Several years ago the deepest producing oil well was in approximately fifteen hundred feet of water. However, deep producing oil wells today operate in depths approaching ten thousand feet of water. Significantly, as the operating depth increases these relatively lightweight, low cost, low strength prior art materials become unsuitable. Specifically, the materials can no longer withstand the hydrostatic pressure and become saturated with water, thus undesirably becoming a thermal conductor rather than an insulator.

Syntactic foam is a known insulator for deep-sea pipeline insulation. As known, syntactic foams are composite materials in which hollow structures, such as microspheres are dispersed in a resin matrix. U.S. Pat. No. 6,058,979 entitled "Subsea Pipeline Insulation", assigned to the assignee of the present invention, discloses a semi-rigid syntactic foam for use in deep-sea operations. U.S. Pat. No. 6,058,979 is hereby incorporated by reference. Significantly, the syntactic foam disclosed in this patent is strong enough to support the macrospheres and provide the requisite crush strength for deep-sea operations, while flexible enough to sustain the bending while being laid. Although the insulated pipeline disclosed in this patent has a number of significant advantages, there are certain limitations. For example, shrinkage caused during curing causes internal stresses that can lead to cracks in the insulation. In addition, the amount of material to be cast at one time may be constrained by processing limits.

Therefore, there is a need for an improved subsea insulated pipeline.

SUMMARY OF THE INVENTION

Briefly, according to an aspect of the present invention, an insulated pipeline comprises an inner pipe, and an outer poly sleeve co-axial with the inner pipe. The inner pipe and the outer poly sleeve are in spaced relationship to define an annulus. An insulating core within the annulus encases lengthwise the inner pipe, and comprises a plurality of pre-cured syntactic elements. A first binder fills interstices in the annulus.

The pre-cured syntactic elements include microspheres and a second binder. Each of the pre-cured syntactic elements may also include macrospheres.

The pre-cured syntactic elements are preferably extruded. In addition, in one embodiment, the second binder is preferably more rigid than the first binder.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
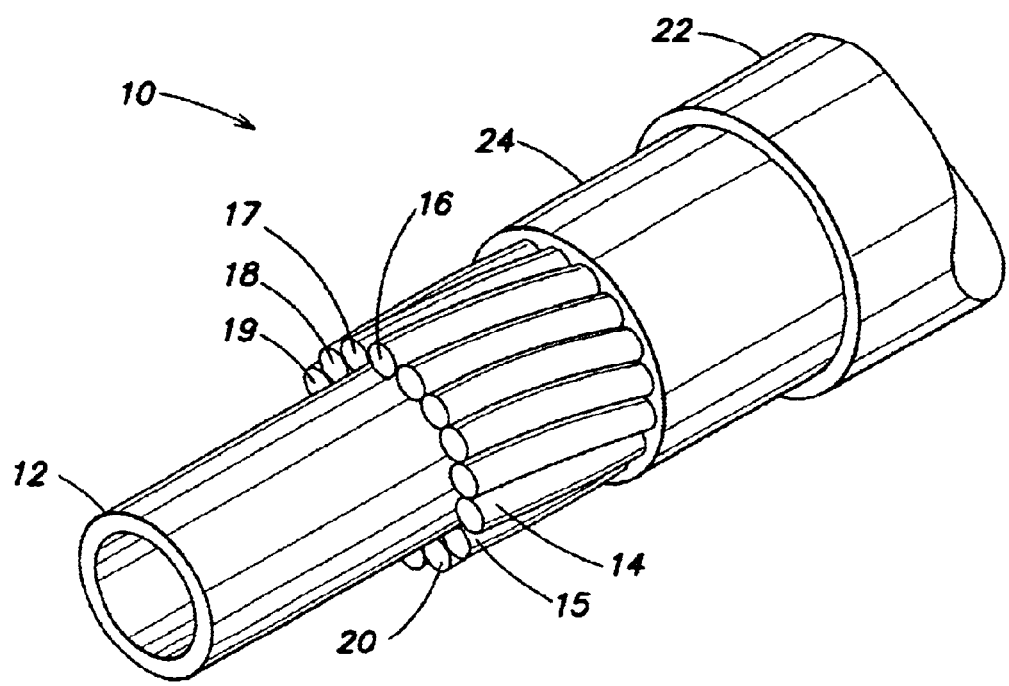
FIG. 1 is a partially cut-a-way view of an insulated pipeline.

FIG. 1 is a partially cut-a-way view of an insulated pipeline 10. The insulating pipeline 10 includes an inner pipe 12 that is typically steel and has a diameter of about 4 to 6 inches and a wall thickness typically 0.25 to 0.5 inches. The pipe 12 is often referred to as "flow line" because oil or gas, or in most cases a combination of the two pass through the pipe. To protect the pipe 12 from the corrosive effects of sea water, a thin anti-corrosion barrier of plastic film or a paint like coating often covers the exterior of the inner pipe 12. Outside of that are a plurality of pre-cured syntactic elements 14–20. The pre-cured syntactic elements 14–20 may for example be helically arranged around the inner pipe 12.

Each of the syntactic elements 14–20 are formed in advance and cured to the point where they can be handled (i.e., pre-cured). In one embodiment, the syntactic elements 14–20 include microspheres within a binder, such as for example a resin binder. The pre-cured syntactic elements 14–20 are loaded into the annulus formed between the steel pipe 12 and an outer poly sleeve 22 (e.g., polyethylene, polypropylene, etc.). The pre-cured syntactic elements 14–20 preferably have a cylindrical cross sectional shape. However, it is contemplated that the syntactic elements 14–20 may have any geometry that allows the syntactic elements to be closely packed within the annulus. In addition, the pre-cured syntactic elements may be configured to any convenient length (e.g., less than one inch to several feet or more).

The syntactic elements 14–20 may be extruded, precast, or formed from epoxy, polyester, urethane, or similar polymeric material, whether rigid or flexible, and filled with glass microspheres or other hollow or solid filler. One of ordinary skill in the art will of course recognize that the exact specifics of the syntactic elements will be selected based upon the operational characteristics of the insulated pipeline, such as the depth and ambient water temperature.

Once the pre-cured syntactic elements 14–20 are located in place about the inner pipe 12, a binder 24 (e.g., a resin binder) is infiltrated into the annulus to fill all voids and interstices. The binder 24 is then cured solid to form the insulated pipeline 10. The binder 24 may also be any polymeric material, rigid or flexible, filled or unfilled, similar to, but not necessarily the same as, the composition of the pre-cured syntactic elements 14–20. It is contemplated that macrospheres may be added to the pre-cured syntactic elements 14–20 and/or the binder 24 for additional performance advantages.

Figure 2:
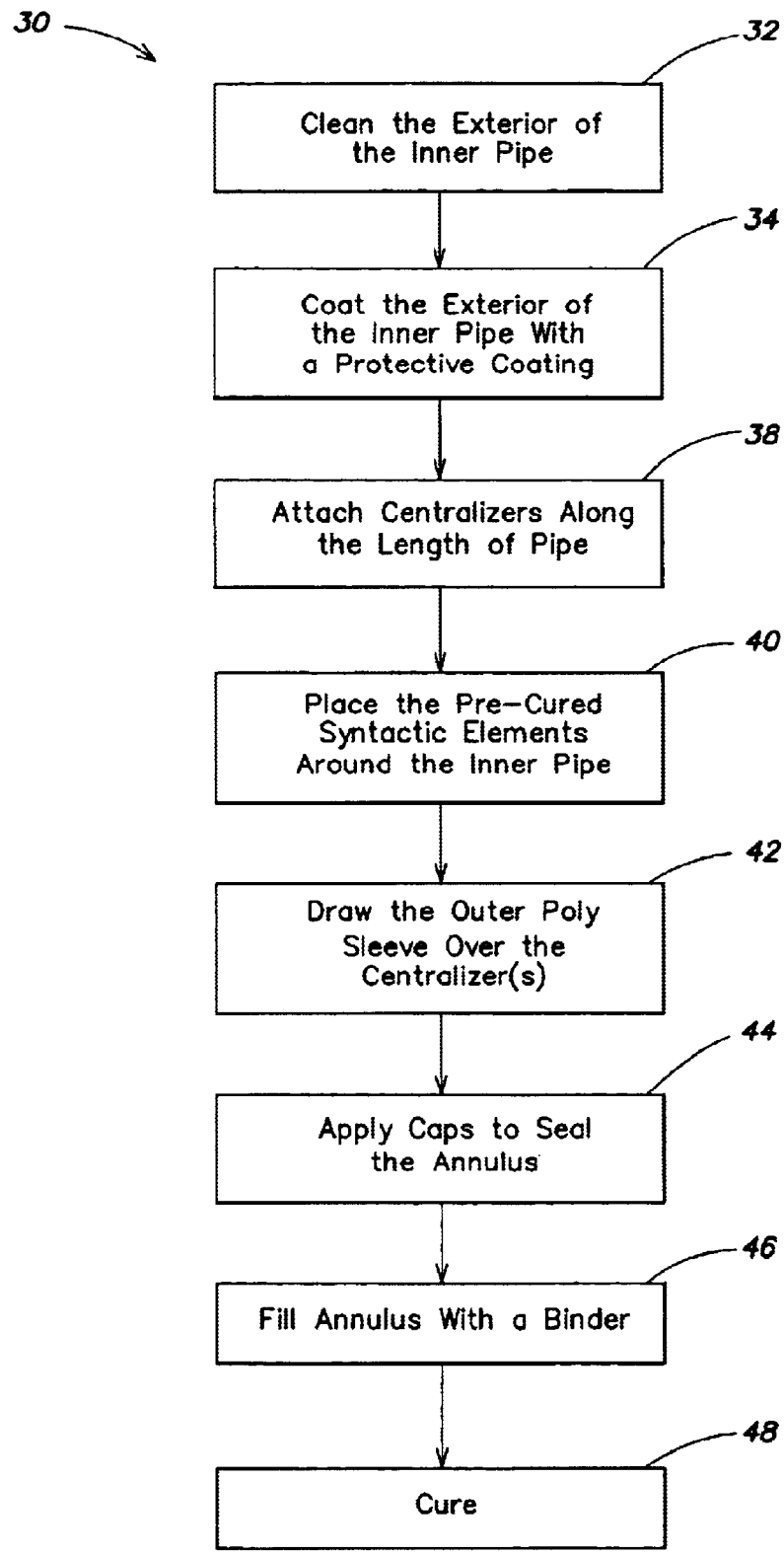
FIG. 2 is a flow chart illustration of a manufacturing process.
Figure 3:
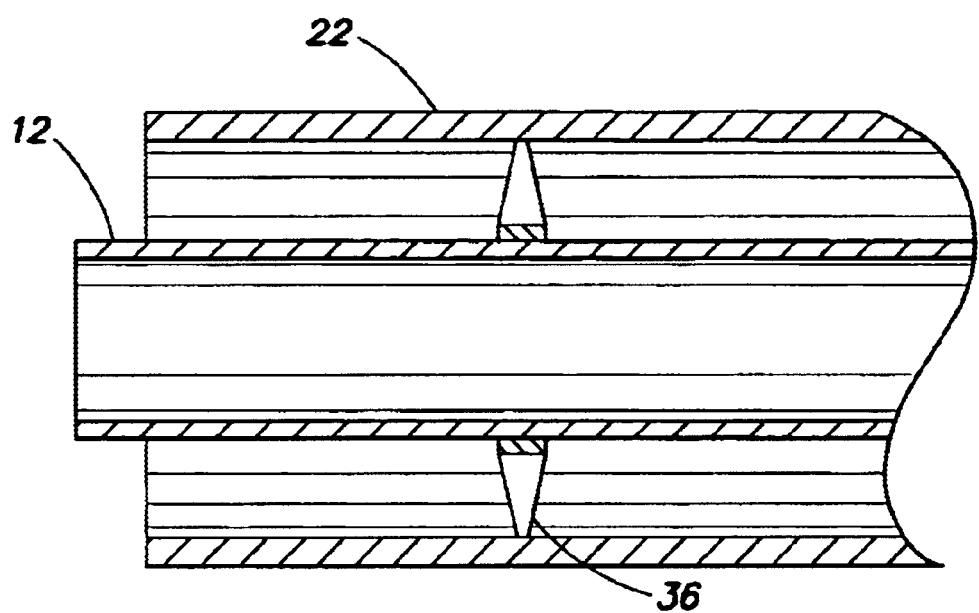
FIG. 3 is a simplified cross-sectional illustration of the insulated pipeline of FIG. 1.

FIG. 2 is a flow chart illustration of a process 30 for manufacturing the insulated pipeline illustrated in FIG. 1. FIG. 3 is a simplified cross-sectional illustration of the insulated pipeline of FIG. 1. The pre-cured syntactic elements are not illustrated in FIG. 3 in the interest of ease of illustration. Referring now to FIG. 3, in step 32 the exterior surface of a length of inner pipe 12 (e.g., forty feet) is cleaned to remove corrosion and scale products. The cleaning may be performed by sandblasting the metallic pipe to provide a clean, bare steel substrate to work with. Step 34 is then performed to apply an epoxy anti-corrosion coating to the surface of the cleaned pipe. As a result, the exterior is a clean plastic surface that is well bonded to the steel pipe.

Referring now to FIGS. 2 and 3, in step 38 a plurality of centralizer supports 36 are then attached at several places along the cleaned length of the inner pipe 12. The centralizers 36 are spider-like devices that coaxially center the inner pipe 12 within the outer poly sleeve 22. In step 40 the pre-cured syntactic elements 14–20 are then placed around the inner pipe. In step 42, the outer poly sleeve 22 is drawn over the centralizer supports 36 to thereby define the annulus between the inner pipe 12 and the outer pipe 22. The outer pipe 22 may be several feet shorter than the inner pipe 12 in order to leave 12–24 inches of the inner pipe exposed on each end. The radial depth of the annulus may be for example about 1 to 3 inches, which represents the radial distance between the exterior of the inner pipe and the interior of the outer pipe.

Step 44 is then performed to apply caps at both ends of the covered pipe to seal the annulus. The annulus is then filled with a binder in step 46 and cured in step 48, and the resultant structure is a length of insulated pipe.

Advantageously, since the pre-cured syntactic elements are formed and cured in advance, the amount of material that must be processed and polymerized at one time is reduced, thus greatly reducing the exotherm and shrinkage involved in making a large casting. In addition, production throughput is greatly increased without any change to cast-on-pipe equipment. Furthermore, the pre-cured syntactic elements 14–20 make it possible for a wide variety of composite behavior, such as for example by mixing various formulations and constructions of the syntactic elements. For example, proportioned mixtures of both flexible and rigid pre-cured syntactic elements, in rigid and flexible binders, can be used to achieve unique combinations of strength and flexibility. Similarly, encapsulating rigid pre-cured syntactic elements in a flexible binder creates a thermally efficient insulation with enough flexibility for reeling and bending applications. Furthermore, the addition of compressible elements, fillers or entrained gas bubbles to either or both components adds to the conformal ability of the insulation.

Although the pre-cured syntactic elements 14–20 have been discussed in the context of cylindrical shaped elements, it is contemplated that of course various other element shapes may be used.

Although the present invention has been shown and described with respect to several preferred embodiments thereof, various changes, omissions and additions to the form and detail thereof, may be made therein, without departing from the spirit and scope of the invention.

What is claimed is:

1. An insulated length of pipe, comprising:
   an inner pipe;
   an outer poly sleeve co-axial with said inner pipe;
   means for spacing said inner pipe and said outer poly sleeve to define an annulus;
   an insulating core within said annulus that encases lengthwise said inner pipe and comprises a plurality of pre-cured syntactic elements; and
   a first binder that fills interstices in said annulus.

2. The insulated pipeline of claim 1, wherein each of said pre-cured syntactic elements includes a cylindrical cross section.

3. The insulated pipeline of claim 1, wherein each of said pre-cured syntactic elements comprises a second binder and microspheres.

4. The insulated pipeline of claim 1, wherein each of said pre-cured syntactic elements comprises macrospheres surrounded by syntactic foam having a second binder and microspheres.

5. The insulated pipeline of claim 1, wherein said first binder comprises a binder resin.

6. The insulated pipeline of claim 4, wherein said second binder comprises a binder resin.

7. The insulated pipeline of claim 1, wherein said pre-cured syntactic elements comprise precast syntactic elements.

8. The insulated pipeline of claim 1, wherein said pre-cured syntactic elements comprise extruded syntactic elements.

9. The insulated pipeline of claim 4, wherein said second binder is more rigid than said first binder.

10. An insulated pipeline, comprising:
    an inner pipe;
    an outer sleeve co-axial with said inner pipe;
    a plurality of centralizers that space said inner pipe and said outer sleeve to define an annulus;
    an insulating core within said annulus that encases lengthwise said inner pipe and comprises a plurality of pre-cured syntactic elements that include macrospheres surrounded by syntactic foam having a first binder and microspheres; and
    a second binder that fills interstices in said annulus.

11. The insulated pipeline of claim 10, wherein said first binder is more rigid than said second binder.

12. The insulated pipeline of claim 10, wherein said pre-cured syntactic elements have a cylindrical cross section.

13. The insulated pipeline of claim 12, wherein said second binder is a polymeric material.

14. A method of insulating a pipe, comprising:
    positioning an inner pipe coaxially within a larger diameter outer casing to form an annulus radially between the inner pipe and the outer casing;
    providing an insulating core that includes a plurality of pre-cured syntactic elements that substantially fill the annulus;
    inserting a binder within the annulus to encase and reinforce the pre-cured syntactic elements; and
    curing the binder to form an insulated pipe.

* * * * *